United States Patent [19]

Stout

[11] 3,832,922
[45] Sept. 3, 1974

[54] AUTOMATIC BACK RIP MACHINE
[75] Inventor: Bud D. Stout, Red Bluff, Calif.
[73] Assignee: Commander Industries, Inc., Red Bluff, Calif.
[22] Filed: Mar. 19, 1973
[21] Appl. No.: 342,678

[52] U.S. Cl............................ 83/4, 83/100, 83/105, 83/420, 83/424, 83/435.2
[51] Int. Cl..... B27b 5/04, B27b 25/02, B23d 47/04
[58] Field of Search...... 83/4, 168, 420, 424, 435.2, 83/436, 421, 425, 100, 102.1, 105

[56] References Cited
UNITED STATES PATENTS

| | | | |
|---|---|---|---|
| 759,589 | 5/1904 | Benner | 83/102.1 |
| 1,786,039 | 12/1930 | Sylva | 83/435.2 X |
| 1,796,369 | 3/1931 | Hirst | 83/435.2 |
| 3,236,272 | 2/1966 | Lawson | 83/436 X |

Primary Examiner—Donald R. Schran
Attorney, Agent, or Firm—Lothrop & West

[57] ABSTRACT

An automatic back rip machine for trimming generally rectangular individual blocks includes a frame arranged adjacent a predetermined path along which the individual wood blocks are propelled. On the frame and intersecting the path is a saw mounted to extend in a horizontal plane virtually across the path. There are means for confining the sides of the wood blocks on the path and there are driven rollers which pinch the sides of the blocks in the vicinity of the saw, the rollers being disposed on the opposite sides of the saw and on the opposite sides of the path as well. At least one of the rollers has a groove for receiving part of the saw so that blocks advanced in the path to the saw are gripped or held and trimmed prior to being released and conveyed away from the saw.

1 Claim, 5 Drawing Figures

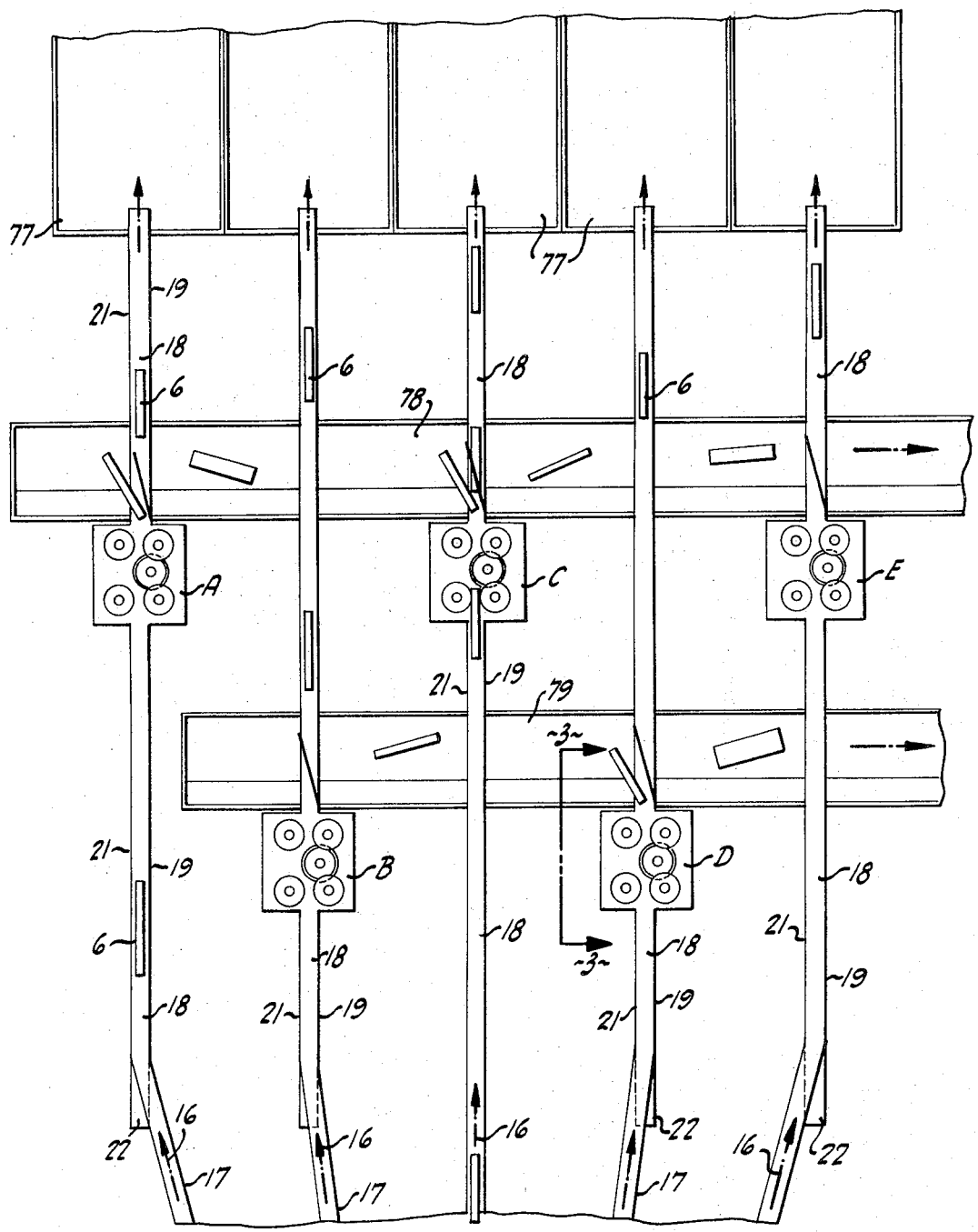
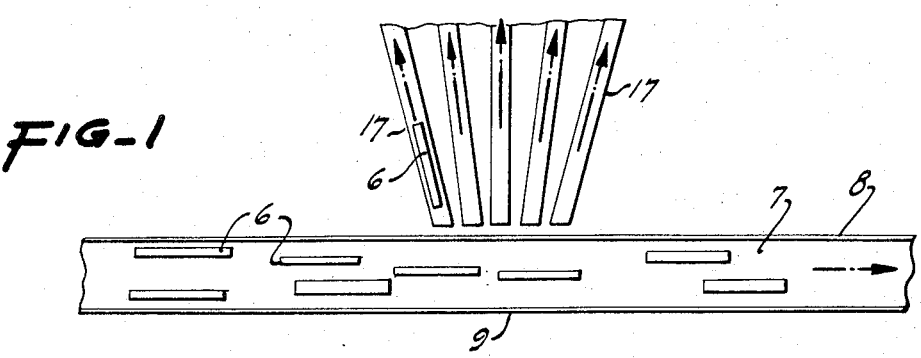
FIG-1

AUTOMATIC BACK RIP MACHINE

The present value of wood is such that it is economic to trim and recover pieces which at one time would have been considered scrap because they contain one or more defects, such as bark, knots or the like. The difficulty is to remove the defects in a relatively economical and expedient, as well as expeditious, fashion.

It is therefore an object of the invention to provide an automatic back rip machine which is comprised of a number of components, each of which is effective to cut off a predetermined portion of a wood block so that the cut off portion contains the deleterious parts while the remaining portion of the block is of satisfactory grade.

Another object of the invention is to provide an automatic back rip machine in which blocks of various sizes can be variously re-cut to remove defects.

Another object of the invention is to provide a back rip machine which will convey blocks automatically through the re-sawing cycle.

A further object of the invention is to provide an automatic back rip machine that can readily be integrated with machinery utilized customarily in a saw mill.

A further object of the invention is in general to provide an improved automatic back rip machine.

Other objects of the invention, together with the foregoing, are attained in the embodiment of the invention described in the accompanying description and illustrated in the accompanying drawings, in which:

FIG. 1 is a plan, partially diagrammatic, of a portion of a lumber mill in which there are employed a number of automatic back rip machines;

FIG. 4 is a cross-section, the plane of which is indicated by the line 4—4 of FIG. 3.

Figure 2:
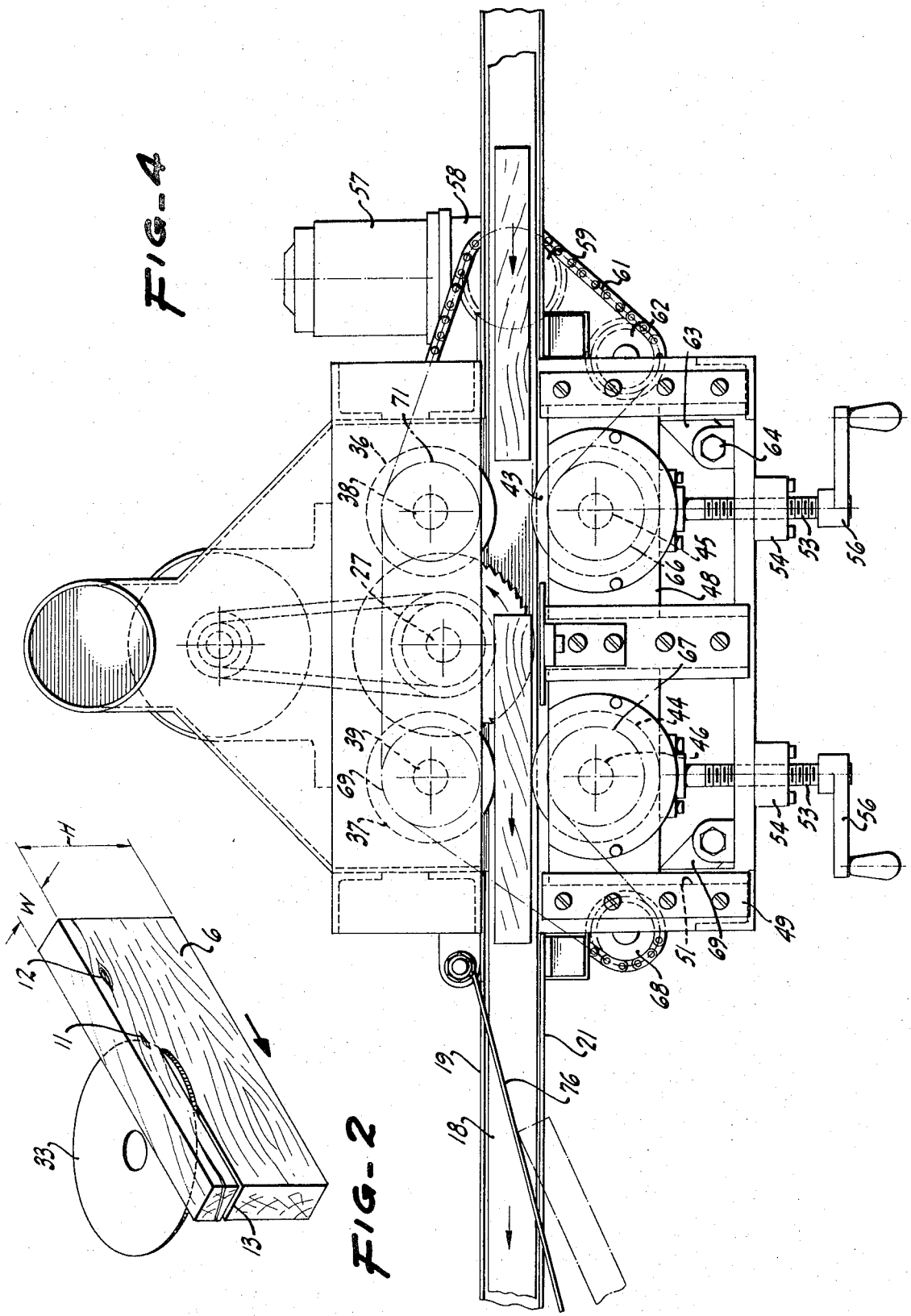
FIG. 2 is a diagram in isometric perspective illustrating the operation of back ripping a wood block to remove a defective portion and to leave an acceptable portion.
Figure 3:
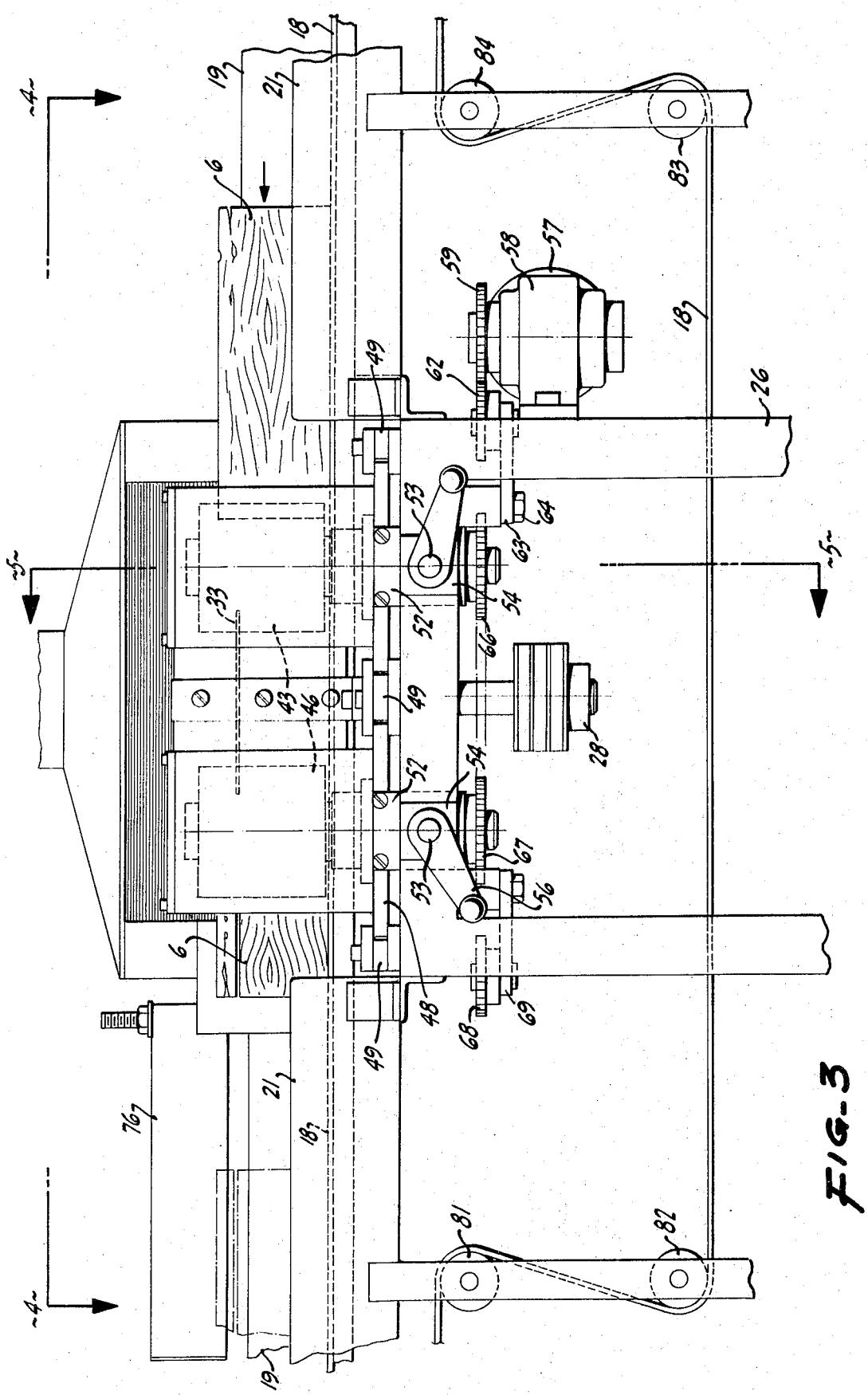
FIG. 3 is a side elevation, with portions removed for clarity, of a back rip machine pursuant to the invention.

In one installation, as shown particularly in FIG. 1, material in the form of wood blocks 6 is received. These blocks preferably are arranged to enter from a previous operation on a conveyor belt 7 with side walls 8 and 9. Most conveniently blocks of substantially the same thickness are handled at one time. The blocks are customarily of approximately uniform height, but may be of random length. As an example, the lengths may range from about 6 or 8 inches to about a foot and a half. An exemplary block 6 is shown in FIG. 2. The block has a predetermined width W, as shown, and has a predetermined height H. A typical block may have a sound portion in the lower areas with defects such as 11 and 12 in the upper portion. It has been found by experience that blocks if sawn along a kerf 13 can readily be separated into an upper, discardable portion so as to leave merchantable, clear material in the remaining portion on the other side of the kerf 13.

In a typical set up, it has been determined that the received blocks can be sawed along any one of five; for example, pre-set kerfs. By appropriate selection, the undesirable portions from all of the blocks can in that fashion be removed to leave maximum good wood. For that reason there are set up five automatic back rip machines indicated in FIG. 1 as A, B, C, D and E. Since each of the machines is the same as the others except for some settings or adjustments and is similarly operated, the following description of one of the machines is intended to describe them all. Each of the machines is located at a chosen point in its own path 16. This may include a diverging downward slide 17, one of similarly disposed and grouped slides for the other machines B, C, D and E, and begins near the conveyor 7.

Inspectors at the convergence of all of the slides examine the incoming blocks for size, position or location of defects therein and decide at which one of five height locations on the block a kerf, such as 13, will separate the unusable from the usable material. Depending upon such selection the blocks are transferred from the conveyor 7 onto chosen ones of the conveyors slides, such as 17. The path is continued from the slide 17, for example, by a conveyor 18 having side walls 19 and 21 and including a bottom belt 22 that extends for the entire length of the pathway.

Figure 5:
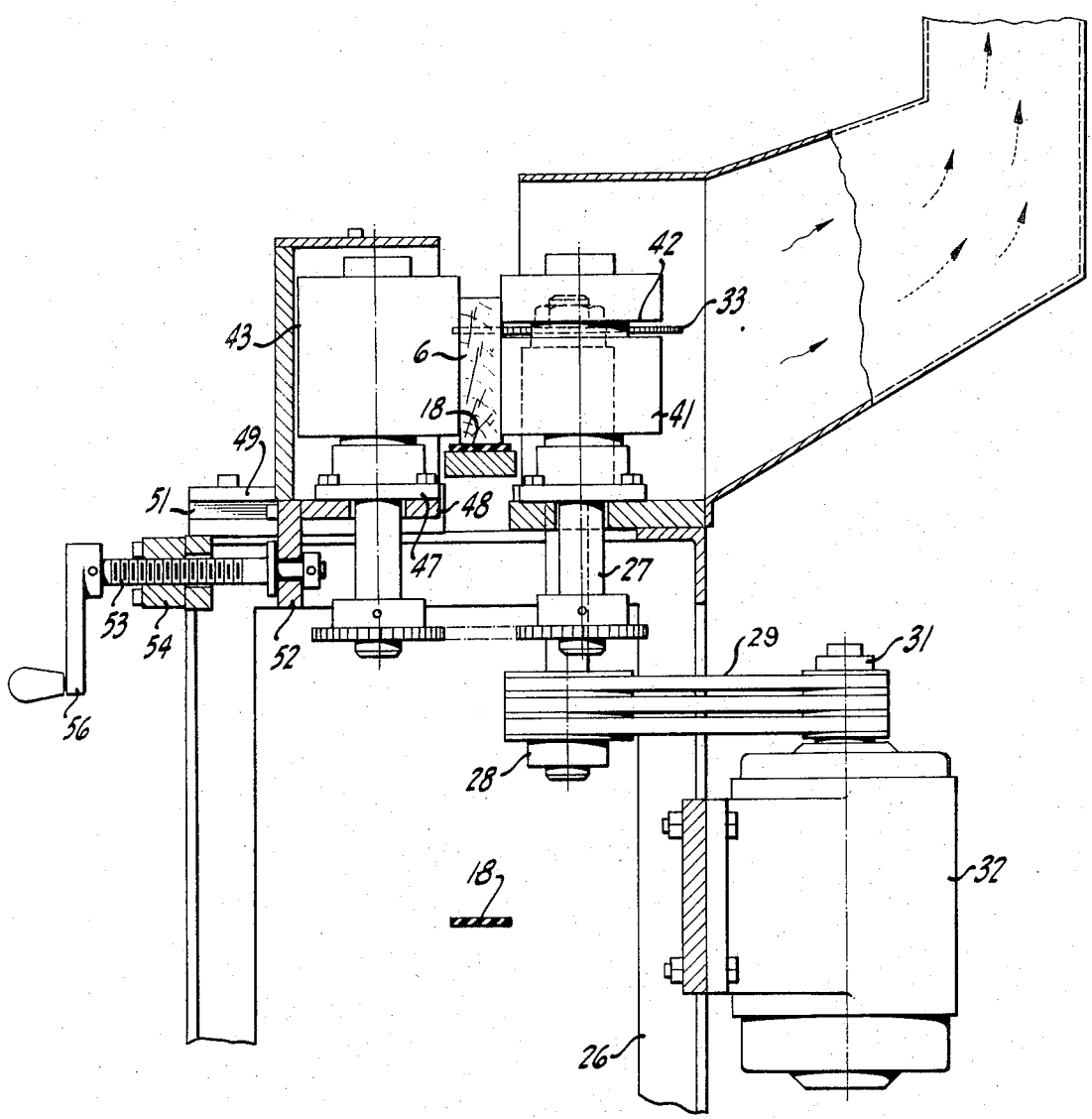
FIG. 5 is a cross-section, the plane of which is indicated by the line 5—5 of FIG. 3.

Disposed at a convenient location along the pathway is a machine, for example A, which is utilized for automatic back ripping. The machine includes a frame 26 of a suitable kind over which the conveyor belt 22 can extend. On the frame 26 in a location alongside the pathway is a saw arbor 27 (FIG. 5) appropriately journalled on the frame and on its lower end carrying pulleys 28 engaged with belts 29 also engaging a drive pulley 31 on an electric drive motor 32 fastened to the frame 26. The upper end of the arbor 27 at a convenient, vertically set or adjustable height carries a saw 33 of a standard kind and of a diameter so that the saw extends substantially over or entirely across the path and is superposed with set spacing above the conveyor 22.

In the machine A, being described, the saw 33 occupies a horizontal plane at a predetermined distance over the bottom of the pathway; that is, above the upper run of the conveyor belt 22. In others of the machines, such as B, C, D and E, the height of the saw 33 is at different selected distances above the conveyor belt 22 so that at the selection station the operator can deposit a block in any one of the various inclined chutes 17 leading to the different machines depending upon the amount of material to be removed from the block or, in other words, depending upon the height at which the kerf 13 is to be cut.

In addition to the side walls 19 and 21 of the pathway, additional means are afforded for supporting, guiding and gripping the blocks. On the frame 26 on one side of the path and also disposed on opposite sides of the saw arbor 27 are special rollers 36 and 37. The rollers are substantially identical and each of them is arranged on one of a pair of shafts 38 and 39 situated with their rotational axes vertical and so disposed that the periphery 41 of the roller can readily come into contact with the side face of a block 6. Since the rollers come into close relationship with the saw, each of them is provided with a peripheral groove 42 of sufficient width and depth so that the saw blade is completely cleared despite overlap in plan. The rollers are preferably driven but by a driver independent of the saw motor 32, so that there can be wide variation in speeds between the rollers and the saw.

Complementing the rollers 36 and 37 and assisting in gripping the blocks passing past the saw is a pair of additional rollers 43 and 44 arranged with their shafts 45 and 46 parallel with the shafts 38 and 39. In order that the rollers may grip blocks passing the saw in the pathway and may be accommodated not only to support the blocks on the sides but also to pinch them slightly, the roller shafts are mounted in bearings 47 supported on individual carriages, such as 48. Since the two independent carriages are substantially identical, a description of one applies equally to the other.

The carriage 48 is provided with gibbs 49 operating in ways 51 in the frame 26. The carriage includes a forward wall 52 in which a screw shaft 53 is journalled. A nut 54 fixed on the frame 26 engages the screw shaft. A manually rotated handle 56 fast on the screw shaft is effective to rotate the shaft and thus to advance the retract the carriage 48. The distance between the carriage roller 43 and its opposite roller 36 can be precisely adjusted. In a similar fashion, the roller 44 is moved toward or away from its opposite roller 37 so that in passing the saw each block is carefully supported and gripped.

In order to drive all of the rollers in the correct direction and at a proper speed, a drive mechanism is provided independent of the saw motor 32, since the speed of operation of the saw and of the rollers is quite different and may involve operation at different times. On the frame 26 in a convenient location is an electric drive motor 57 operating through a gear reduction 58 to rotate a drive sprocket 59. With this sprocket is engaged a link belt or chain 61 which progresses over an idler sprocket 62 carried by an adjustable arm 63 mounted by a pivot bolt 64 on the frame 26.

The chain 61 then travels around a sprocket 66 on the shaft 45 and from thence travels across to a similar sprocket 67 on the shaft 46 for the roller 44. The chain extends around other idler sprocket 68 similarly mounted on an idler arm 69 pivoted to the frame 26 and from there travels to a sprocket 69 on the shaft 39 so as properly to drive the roller 37. From that point the chain extends across to a sprocket 71 for the roller 36 and from there goes back to the beginning sprocket 59. With this mechanism, when the motor 57 is appropriately energized, all of the sprockets and idlers are turned in the proper directions so that the facing surfaces of the four rollers all advance in the same direction, as indicated in FIG. 4, as the direction of advance of the block.

In the operation of this structure with the motors energized, a block approaching on the conveyor belt 22 is well confined between sides 19 and 21 and is suitably supported. It advances at a designated rate until it comes immediately between the rollers 36 and 43 whereat it is gripped with sufficient force to make sure that it is very firmly supported laterally and is advanced at the speed of the rollers without substantial slippage. The block is in this fashion fed to the rapidly rotating saw 33 which cuts the block with a kerf 13 at the desired height from the belt, as set initially for this particular machine A.

As the block continues past the saw it is severed on the kerf line into an upper portion and a lower portion. The upper portion is of no value. The severed portions remain superposed and are both removed from the saw. They are advanced toward the left in FIG. 4 until such time as the upper portion encounters a deflecting barrier 76 which spills the severed upper portion of the block laterally over a low portion in the side wall 21 of the conveyor.

The sound lower portion of the block proceeds on the belt under the deflecting barrier 76 and is confined by the walls 19 and 21 to an appropriate point for disposition. This usually is a bin 77 arranged in a convenient location to receive the discharge of the conveyor 22. Thus, in each of several similarly positioned bins are finally disposed sound blocks that have been appropriately trimmed.

The deflected unsound portions of varying thicknesses from the different machines A, C and E are dumped onto a conveyor belt 78 by their deflectors and are carried away. Similarly, waste from the machines B and D is dumped onto a parallel conveyor belt 79 and is likewise carried to disposition.

The upper run of the conveyor belt 22 clears the bin 77 and returns to the point of beginning, being appropriately deflected under the back rip saw machine by a series of idler rollers 81, 82, 83 and 84 positioned on machine supports 86 and 87 so that the return run of the conveyor belt is clear of the saw mechanism.

What is claimed is:

1. An automatic back rip machine comprising:
  a. a frame;
  b. means on said frame for guiding wood blocks thereover in a predetermined path;
  c. a saw;
  d. means for mounting said saw on said frame with said saw extending in a horizontal plane into said path;
  e. means on said frame for confining the sides of wood blocks in said path in the vicinity of said saw, said confining means including rollers, means for mounting said rollers for rotation about vertical axes, two of said rollers being disposed on one side of said path, said two of said rollers being partially overlapped in plan by said saw and slotted circumferentially to receive part of said saw, and two others of said rollers being disposed on the other side of said path, the last mentioned two rollers being in transverse alignment with the respective ones of the first mentioned two rollers to form two pairs of rollers, one roller pair being located ahead of said saw and the other roller pair being located on the discharge side of said saw;
  f. means for positioning said two roller pairs to engage wood blocks in said path while the blocks are being cut by said saw, said positioning means being selectively adjustable to engage blocks of different thickness; and,
  g. means for driving said rollers to advance the wood blocks along said path in opposition to the force exerted by said saw.

* * * * *